United States Patent
Kralik et al.

(10) Patent No.: US 6,654,072 B2
(45) Date of Patent: Nov. 25, 2003

(54) HIGH CONTRAST PDLC TRANSMISSION GRATINGS AND METHOD OF MANUFACTURE

(75) Inventors: John C. Kralik, Lansdale, PA (US); Michelle M. Stone, Hellertown, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 38 days.

(21) Appl. No.: 10/021,329

(22) Filed: Oct. 30, 2001

(65) Prior Publication Data

US 2002/0097355 A1 Jul. 25, 2002

Related U.S. Application Data

(60) Provisional application No. 60/249,679, filed on Nov. 17, 2000.

(51) Int. Cl.$^7$ ............................................. G02F 1/1335
(52) U.S. Cl. ......................................................... 349/15
(58) Field of Search .................................... 349/209, 15

(56) References Cited

U.S. PATENT DOCUMENTS

| | | | |
|---|---|---|---|
| 4,688,900 A | 8/1987 | Doane et al. | 350/347 V |
| 4,890,902 A | 1/1990 | Doane et al. | 350/347 V |
| 5,731,853 A * | 3/1998 | Taketomi et al. | 349/15 |
| 5,864,375 A * | 1/1999 | Taketomi et al. | 349/15 |
| 5,942,157 A | 8/1999 | Sutherland et al. | 252/582 |
| 6,014,187 A * | 1/2000 | Taketomi et al. | 349/15 |

OTHER PUBLICATIONS

"Phase Separation Methods for PDLC Films," by Paul S. Drzaic, Raychem Corporation; *Liquid Crystal Dispersions*, Series on Liquid Crystals, vol. 1, pp. 39–41, 1995 by World Scientific Publishing Co. Pte. Ltd.

"The Morphology and Performance of Holographic Transmission Gratings Recorded in Polymer Dispersed Liquid Crystals," by T. J. Bunning, L. V. Natarajan, V. Tondiglia, R. L. Sutherland, D. L. Veziet and W. W. Adams; *Polymer*, vol. 36, No. 14, 1995, pp. 2699–2708, 1995 by Elsevier Science Ltd.

"Light Diffraction at Mixed Phase and Absorption Gratings in Anisotropic Media for Arbitrary Geometries," by G. Montemezzani and M. Zgonik; *Physical Review E*, vol. 55, No. 1, Jan. 1997, pp. 1035–1047, 1997 by The American Physical Society.

"Characteristic of Photonic Time Shifters Based on Switched Gratings," by Thomas W. Stone, John C. Kralik and Michelle S. Malcuit; *Proceedings of SPIE Reprint, Reprinted from Photonics and Radio Frequency II*, vol. 3463, Jul. 21–22, 1998, San Diego, California, pp. 86–97, 1998 by the Society of Photo–Optical Instrumentation Engineers.

(List continued on next page.)

*Primary Examiner*—John F. Niebling
*Assistant Examiner*—André C Stevenson

(57) ABSTRACT

A PDLC transmissive phase grating utilizing nematic liquid crystal materials confined in a polymer matrix. The PDLC grating operates in the Bragg regime and switches between diffracting and non-diffracting states via an applied electric field. The grating is made up of a PDLC grating film contained within a cell. The PDLC film has a spatially periodic distribution of grating planes which includes polymer-rich regions and liquid crystal-rich regions, wherein the major constituent of the polymer-rich regions is a polymer, and wherein the liquid crystal constituent concentration within the liquid crystal-rich regions is greater than the liquid crystal constituent concentration within said polymer-rich regions. The PDLC transmission phase grating is rendered substantially transparent when subjected to an electric field during the application of light that is p-polarized and incident on the grating at Bragg angle.

19 Claims, 5 Drawing Sheets

OTHER PUBLICATIONS

"Performance of Photonic Switching Systems Based on Electro–Optic Volume Holographic Diffraction Gratings," by Thomas W. Stone, John C. Kralik, Randall C. Veitch and Michelle S. Malcuit; *Proceedings of SPIE Reprint, Reprinted from Radio Frequency Photonic Devices and Systems*, vol. 4112, Jul. 31–Aug. 1, 2000, San Diego, USA, pp. 38–47, 2000 by the Society of Photo–Optical Instrumentation Engineers*.

"Switchable holograms in new photopolymer–liquid crystal materials", by Richard L. Sutherland, Lalgudi V. Natarajan and Vincent P. Tondiglia, Science Applications International Corporation; and Timothy J. Bunning and W. Wade Adams, Materials Directorate, Wright Laboratory; XP–000853766, date of publication unavailable at this time.

"Electrically switchable volume gratings in polymer–dispersed liquid crystals", by R.L. Sutherland, V.P. Tondiglia and L.V. Natarajan, Science Applications International Corporation; and T. J. Bunning and W.W. Adams, Materials Directorate, Wright Laboratory; Applied Physics Letters 64 Feb. 28, 1994, No. 9, pp. 1074–1076.

* cited by examiner

HIGH CONTRAST PDLC TRANSMISSION GRATINGS AND METHOD OF MANUFACTURE

CROSS REFERENCE TO RELATED APPLICATIONS

This application claims priority of U.S. Provisional Application Ser. No. 60/249,679 filed Nov. 17, 2000 which is incorporated herein by reference.

This invention was made with Government support under Contract No. F30602-98-C-0079 awarded by the U.S. Air Force. The U.S. Government has certain rights in the invention.

FIELD OF THE INVENTION

The present invention relates generally to diffraction gratings made using polymer dispersed liquid crystal (PDLC) materials, and, more particularly, to thick volume PDLC diffraction gratings with high switching contrast.

BACKGROUND OF THE INVENTION

Transmission gratings made using polymer-dispersed liquid crystal, or PDLC, materials have been shown useful for the construction of low loss electrooptic switches. For example, Stone et al. in Proc. SPIE 4112, 38–47 (2000) describe optical switches based on cascades of electrically switched PDLC transmission gratings. Such gratings operate in the Bragg regime and an incoming optical beam is switched between the zero- and first-diffracted orders via an applied electric field. More specifically, a PDLC grating diffracts an incident optical beam unless a sufficiently strong electric field is applied across it, in which case the grating is rendered transparent, or clear.

The PDLC gratings described by Stone et al. can be further characterized as phase gratings, because the PDLC morphology includes switchable nematic liquid crystal content contained in isolated or interconnected cavities that are much smaller than the wavelength of the optical beam being switched. This results in gratings with microsecond switching time and low intrinsic scattering loss at wavelengths in the near infrared spectral region. The article by Stone et al., though, does not provide specific instruction on how PDLC phase gratings may be optimized for high contrast performance. As highlighted by Stone et al. in Proc. SPIE 3463, 86–97 (1998), high contrast gratings are essential for building switches with low crosstalk.

In another example, Sutherland et al. in U.S. Pat. No. 5,942,157 describe how PDLC materials may be formulated and applied to the fabrication of electrically switchable diffractive and refractive devices. In this reference, a description of the PDLC grating switching mechanism is provided; the condition for optical transparency is described as requiring the polymer index of refraction be equal to the ordinary refractive index of the nematic liquid crystal. This description is simplistic and fails to adequately describe salient features of PDLC phase grating operation; especially, the operation of PDLC transmission gratings with p-polarized optical beams. As a result, it provides no teaching on the fabrication of gratings with high contrast.

In yet another example, Bunning et al. in Polymer 36(14), 2699–2708 (1995) describe the operation of PDLC transmission gratings. As in the previous example, a simplistic description is provided to describe the optically clear state of the gratings; no instruction for the fabrication of high contrast PDLC gratings is offered.

In U.S. Pat. No. 4,688,900, Doane et al. describe PDLC light modulating materials that can be switched from substantially scattering to substantially clear states using either an applied electric field or thermally, by heating the PDLC materials. Subsequently, in U.S. Pat. No. 4,890,902, Doane et al. describe PDLC materials with selectable viewing angles. In particular, formulations are described that allow the fabrication of PDLC films that can be switched to a clear state for a selected viewing angle, or range of viewing angles. This is accomplished by selecting or adjusting the polymer constituent of the PDLC according to the index of refraction. The descriptions offered by Doane work for scattering mode PDLC devices; however, it cannot be extended to PDLC phase gratings to devise a grating with high contrast operation.

Therefore, it is an object of this invention to provide PDLC transmission gratings with high switching contrast.

It is a further object of this invention to provide high switching contrast PDLC transmission gratings by optimizing the optical properties of the PDLC constituents.

It is still a further object of this invention to provide high switching contrast PDLC transmission gratings by optimizing the selection of switching field and Bragg angle.

SUMMARY OF THE INVENTION

The objects set forth above as well as further and other objects and advantages of the present invention are achieved by the embodiments of the invention described herinbelow.

The present invention relates to PDLC transmissive phase gratings, also referred to as optical switches, which utilize nematic liquid crystal materials confined in a polymer matrix. Such gratings can be used as, but are not limited to, switchable beamsteering devices for free-space optical beams. In order to be useful for telecommunications and other applications, it is desirable that the PDLC gratings operate in the Bragg regime and switch between diffracting and non-diffracting states via an applied electric field. Further, it is desirable that the gratings provide high contrast and low loss.

In this invention, salient PDLC grating parameters are described in the context of providing optimized PDLC transmission gratings with high contrast switching. The interplay between the PDLC materials optical properties, the grating period, and the applied electric field strength are also elucidated in this invention, as is the impact of these three grating properties on switching contrast.

For a better understanding of the present invention, together with other and further objects thereof, reference is made to the accompanying drawings and detailed description.

DETAILED DESCRIPTION OF THE PREFERRED EMBODIMENTS

The present invention relates to polymer-dispersed liquid crystal (PDLC) transmission gratings with high switching contrast and techniques for their manufacture. The PDLC materials utilized with the present invention refer to the class of polymer dispersed nematic liquid crystal materials that phase separate spontaneously via photo-induced polymerization. The PDLC gratings of this invention operate in the Bragg regime and exhibit low insertion loss, high index modulation, switching times in the microsecond regime, and high contrast, or equivalently, low crosstalk.

Figure 1:
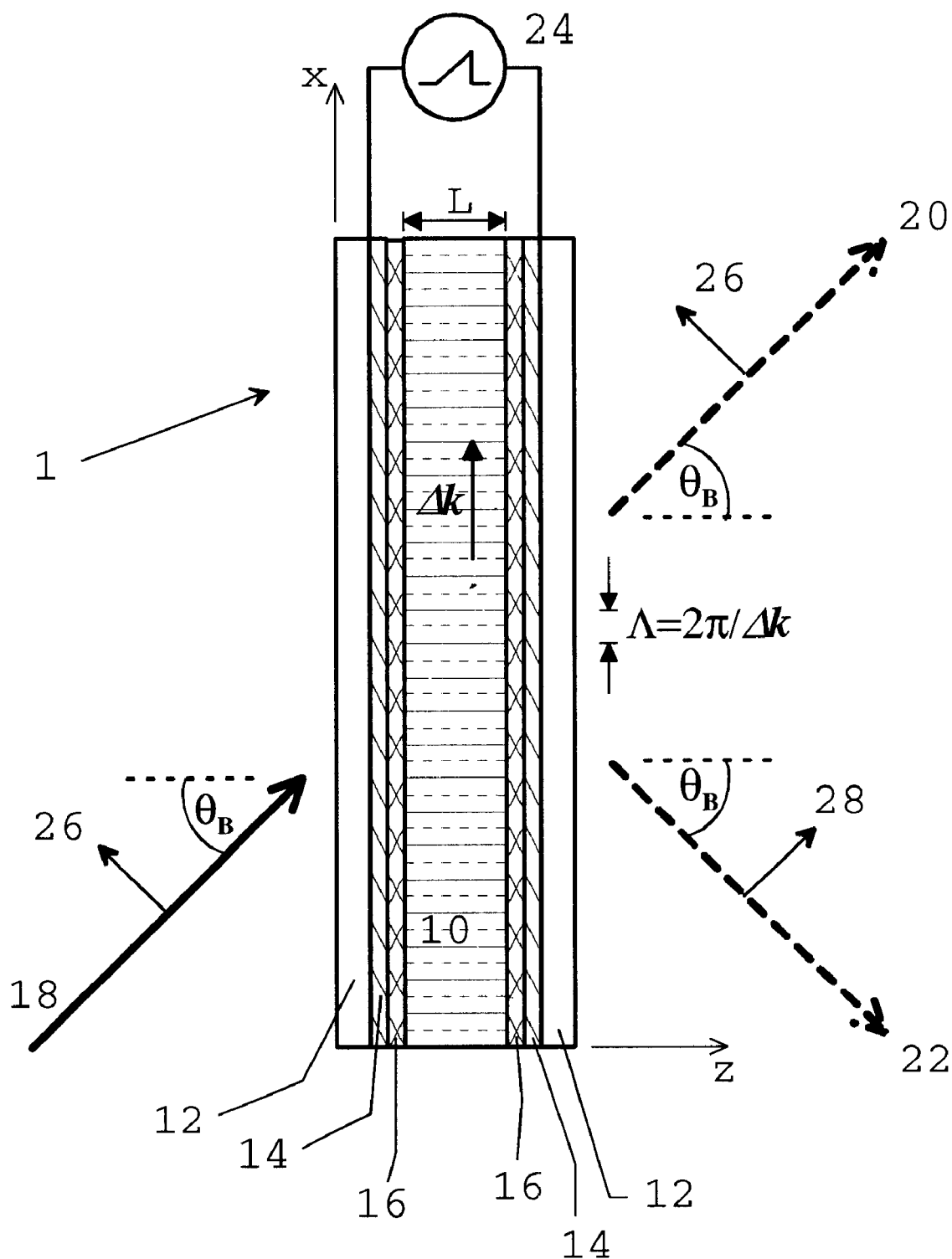
FIG. 1 is a schematic illustration of the PDLC transmission grating of this invention used as a switch.

FIG. 1 is a schematic diagram of the PDLC transmission grating 1 of this invention showing how it functions as, for example, an optical switch. Other uses of the present invention, such as a beamsteering device etc., are also feasible. A PDLC grating film 10 with a spatial period $\Lambda$ is recorded via standard holographic techniques. The grating vector $\Delta k$, with magnitude $\Delta k = 2\pi/\Lambda$, is parallel with the x-axis so that each grating plane is parallel to the yz-plane. As such, the grating planes are referred to as unslanted.

The PDLC grating film 10 is contained within a cell comprising of two transparent substrates 12 preferably made of glass or plastic coated with a transparent indium-tin-oxide (ITO) conducting film 14 which facilitates the application of an electric field across the grating film 10. In addition, the ITO films may be coated with dielectric insulator and/or index matching layers 16 (optional). Spherical or cylindrical spacers (not shown) are used to separate the glass substrates 12 and maintain the cell thickness L throughout the cell.

During use, a collimated, p-polarized optical beam 18 with wavelength $\lambda$ is shown incident on the grating 10 within the xz-plane and at the Bragg angle $\theta_B$. The Bragg angle $\theta_B$ and spatial period of the grating $\Lambda$ are related according to the well-known Bragg relationship: $2\Lambda \sin \theta_B = \lambda$. Note that both $\theta_B$ and $\lambda$ are measured external to the grating cell, and so $\theta_B$ shall be referred to as the external Bragg angle. The incoming beam 18 is transmitted through the grating in the m=0 order 20 when a sufficiently strong electric field is applied across the grating 10, or is diffracted into the m=+1 order 22 when the field amplitude is zero. A conventional amplifier 24 connected to the cell via the ITO layers 14 generates the electric field.

Note that only the zero- 20 and first-order 22 diffracted beams shown in FIG. 1 have non-negligible amplitude, as a result of the grating 10 being in the Bragg regime. Note too, that the incident 18, zero-order 20, and first-order beams 22 are all p-polarized.

The PDLC grating film 10 of this invention can be described mathematically using the formalism for thick volume diffraction gratings put forth by G. Montemezzani and M. Zgonik in Physical Review E 55(1), 1035–47 (1997). Montemezzani and Zgonik derive an expression for the diffraction efficiency $\eta$ of a lossless, anisotropic phase grating. More specifically, the diffraction efficiency for p-polarized light incident on the grating film 10 at the Bragg angle can be written $$\eta = \sin^2\left(\frac{\pi n_1 L}{\lambda \cos\theta'_B}\right). \tag{1}$$

In Eq. (1), $n_1$ is the effective index modulation, L is the grating thickness, $\lambda$ is the wavelength of incident light during use, and $\theta'_B$ is the Bragg angle inside the grating film, or internal Bragg angle. The internal Bragg angle $\theta'_B$ is related to the external Bragg angle $\theta_B$ via Snell's law. The effective index modulation $n_1$ is a function of the internal Bragg angle and the spatially varying, electric-field-dependent dielectric tensor of the grating. During operation as an optical switch, the effective index modulation can be made to vary between zero and a finite value using an electric field.

Figure 2:
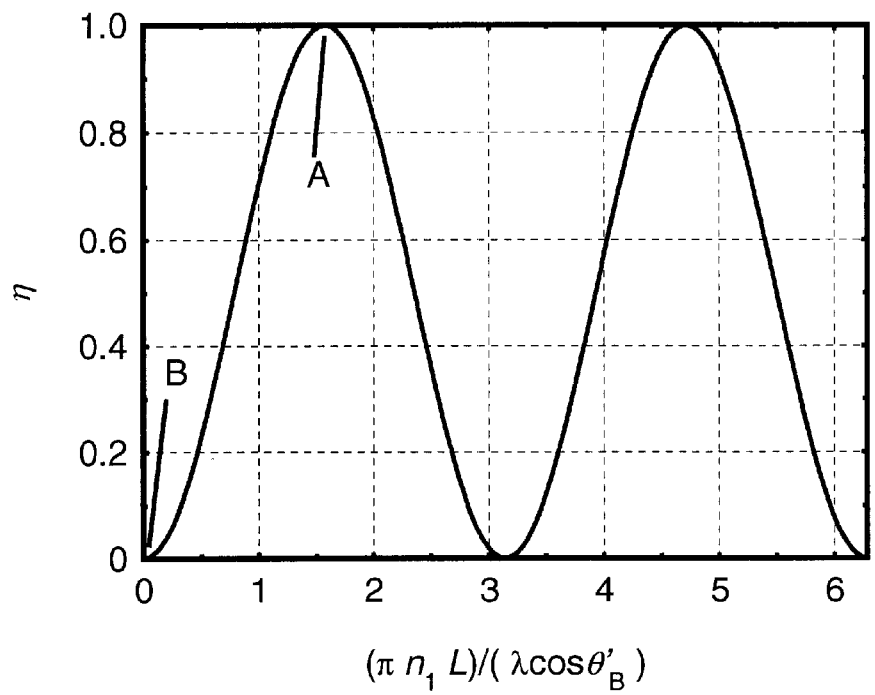
FIG. 2 is a graph showing diffraction efficiency for the PDLC grating of this invention.

Equation (1) is plotted in FIG. 2 as a function of $(\pi n_1 L)/(\lambda \cos \theta'_B)$ to show how the transmission grating of this invention operating in the Bragg regime can function as an optical switch with the diffraction efficiency represented by $\eta$. For example, if the argument of the sine function in Eq. (1) is made to vary between $\pi/2$ and 0 radians, the diffraction efficiency will vary between unity and zero, as indicated by points A and B in the figure. A thick, volume PDLC transmission grating will operate at point A in the field-off state if the grating thickness L is chosen appropriately, because $n_1$ is non-zero in the absence of an electric field. However, a PDLC grating will operate at point B in FIG. 2 when the effective index modulation vanishes. The condition $n_1 = 0$ is satisfied in the field-on state only for specific choices of the field strength, the internal Bragg angle, and the optical dielectric properties of the PDLC grating film, as the following analysis of the present invention shows.

Figure 3:
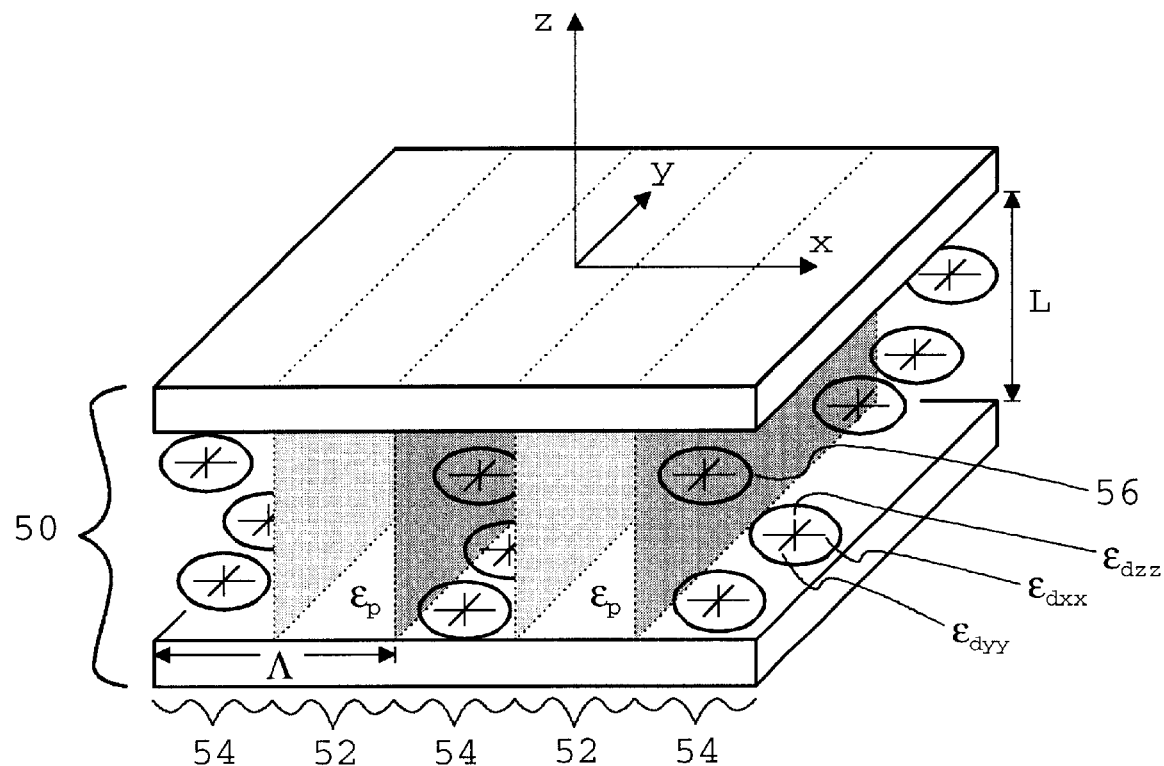
FIG. 3 is a pictorial representation, in schematic fashion, of the PDLC transmission grating of this invention.

FIG. 3 shows in schematic fashion the underlying structure of PDLC transmission grating film 10; this figure uses the same coordinate system utilized in FIG. 1. The PDLC transmission grating shown in FIG. 3 is in a cell 50 prepared according to the above description accompanying FIG. 1. The grating spatial period is $\Lambda$ and the grating is comprised of a PDLC film of thickness L having polymer-rich regions 52 (wherein the major constituent is a polymer) and nematic liquid crystal-rich, or N-rich, regions 54 (wherein the nematic liquid crystal constituent is present at a higher concentration than in the polymer-rich regions 52). The PDLC grating is a spatially periodic structure that forms spontaneously via photo-induced phase separation that occurs using a spatially inhomogeneous illumination source such as would obtain using interfering optical beams in a holographic recording.

The polymer-rich regions 52 are optically isotropic and can therefore be characterized by a scalar optical dielectric constant $\in_P$.

In contrast, the N-rich regions 54 are optically anisotropic due to the higher concentration of nematic liquid crystal material in these regions, compared to the polymer-rich regions 52. FIG. 3 shows, for example, that the N-rich regions include discrete N-rich droplets dispersed in a polymer matrix. In fact, the N-rich regions 54 may contain discrete N-rich droplets, or may contain an inter-connected network of cavities filled with N-rich material. As pointed out by Drzaic in *Liquid Crystal Dispersions* (World Scientific Publishing Co., Singapore, 1995), pp. 39–41, in acrylate-based PDLC materials, for example, the specific droplet morphology and interconnectivity is a sensitive function of the starting materials, as well as the polymerization rate. Nevertheless, FIG. 3 shows, for example, discrete droplets. Further, it is well known that the droplets may contain other chemical species left over after the polymerization process; however, as these constituents are in the minority, the N-rich droplets and interconnected regions will be referred to as simply nematic droplets.

An example of nematic droplets 56 is highlighted in FIG. 3. The nematic droplets 56 shown in the figure can be described by a diagonal optical dielectric tensor with components $\in_{dxx}$, $\in_{dyy}$ and $\in_{dzz}$ along the x-, y- and z-axes, respectively. Note that the nematic content in the N-rich regions 54 will reorient under the influence of a sufficiently strong electric field; therefore, these dielectric components are functions of the applied field strength, E. Note, too, that the nematic droplets or interconnected regions are small in comparison with the wavelength of the incident optical beam during use. Thus, the optical dielectric properties of the N-rich regions 54 will be an admixture of the optical dielectric properties of the polymer matrix and the nematic droplets. The resulting grating will thus be classified a phase grating, rather than an amplitude grating, since the N-rich regions do not scatter incident light during use.

Utilizing the model described above and shown in FIG. 3, the optical dielectric tensor $\overline{\in}_N$ of the N-rich regions 54 may be written $$\overline{\in}_N = (1-\phi_d)\in_P \delta_{ij} + \phi_d \overline{\in}_d(E), \quad (2)$$

where $\phi_d$ is the volume fraction of N-rich droplets, $\delta_{ij}$ is the identity matrix, $\overline{\in}_d(E)$ is the optical dielectric tensor of an individual droplet, and E is the applied electric field strength. Without limiting the scope of this invention, the optical dielectric constant of the polymer matrix in the N-rich regions 54 is assumed to be the same as the optical dielectric constant of the polymer-rich regions 52.

The present invention utilizes Eq. (2) and the information presented in FIG. 3, such that the modulation in optical dielectric tensor, $\overline{\in}^{(1)}$, may be written as follows:

$$\overline{\in}^{(1)} = (\overline{\in}_N - \in_P \delta_{ij})/2 = \frac{\phi_d}{2} \begin{pmatrix} \varepsilon_{dxx}(E) - \varepsilon_P & 0 & 0 \\ 0 & \varepsilon_{dyy}(E) - \varepsilon_P & 0 \\ 0 & 0 & \varepsilon_{dzz}(E) - \varepsilon_P \end{pmatrix}. \quad (3)$$

Next, referring to the formalism of Montemezzani and Zgonik, the effective index modulation $n_1$ is linearly proportional to the following quantity:

$$n_1 \sim \hat{e}_1 \cdot \overline{\in}^{(1)} \cdot \hat{e}_0. \quad (4)$$

In Eq. (5), $\hat{e}_1 = \cos\theta'_B \hat{x} + \sin\theta'_B \hat{z}$ and $\hat{e}_0 = \cos\theta'_B \hat{x} - \sin\theta'_B \hat{z}$ are unit vectors along the polarization directions of the m=+1 and m=0 beams as measured inside the grating, respectively. Thus, the effective index modulation is written:

$$n_1 \sim \frac{\phi_d}{2}[(\varepsilon_{dxx}(E) - \varepsilon_P)\cos^2\theta'_B - (\varepsilon_{dzz}(E) - \varepsilon_P)\sin^2\theta'_B]. \quad (5)$$

The condition that the grating diffraction efficiency is zero—i.e. the field-on state of the grating—leads to the condition $n_1=0$, which, according to Eq. (5), leads to the following relation:

$$\tan^2\theta'_B = \frac{\varepsilon_{dxx}(E) - \varepsilon_P}{\varepsilon_{dzz}(E) - \varepsilon_P}. \quad (6)$$

Extending this concept of the present invention, and without limiting the scope of the invention, the functional forms of the field-dependent dielectric tensor components appearing in Eq. (6) are:

$$\varepsilon_{dxx}(E) = \varepsilon_{do} + (\varepsilon_{de} - \varepsilon_{do})\sin^2\Theta_E \quad (7)$$

$$\varepsilon_{dzz}(E) = \varepsilon_{do} + (\varepsilon_{de} - \varepsilon_{do})\cos^2\Theta_E.$$

In Eq. (7), $\in_{do,de}$ are the ordinary and extra-ordinary dielectric components of an individual nematic droplet in the absence of an applied field, respectively, and $\Theta_E$ shall be referred to as the electric field dependent, effective orientation angle for nematic directors within any given droplet. Without loss of generality, it is assumed that both $\in_{do}$ and $\in_{de}$ are admixtures of the nematic ordinary and extra-ordinary indices, $n_o$ and $n_e$, and that $\Delta\in_d \equiv \in_{de} - \in_{do} \sim \Delta n$, where $\Delta n = n_e - n_o$ is the nematic birefringence. Since $\Delta n > 0$ for all nematics of interest, $\Delta\in_d > 0$. Note that the average value of the droplet dielectric components $\overline{\in}_d$ is independent of the field strength and is given by $$\overline{\varepsilon}_d = \frac{\varepsilon_{dxx}(E) + \varepsilon_{dzz}(E)}{2} = \frac{\varepsilon_{do} + \varepsilon_{de}}{2} = \text{constant.} \quad (8)$$

Figure 4:
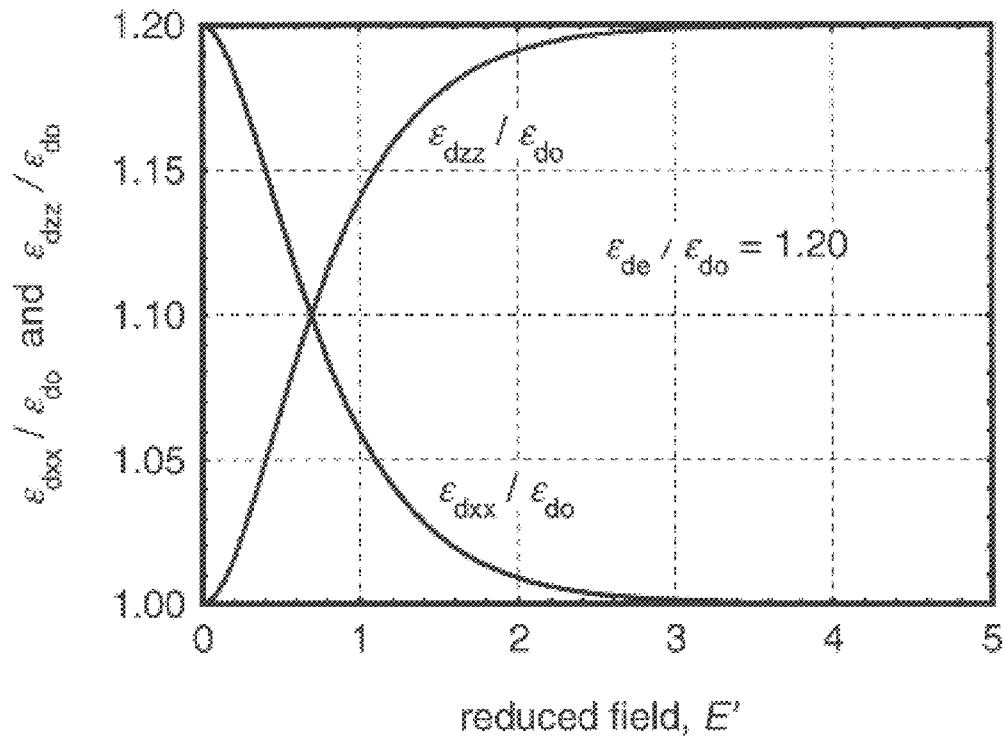
FIG. 4 is a graph of optical dielectric tensor components along the x- and z-axes as a function of reduced electric field.

Further, without limiting the scope of this invention, a physical description of the field dependence of the orientation angle $\Theta_E$ is provided as $$\Theta_E = \begin{cases} \frac{\pi}{2} & (0 < E < E_{th}) \\ \frac{\pi}{2}\exp\left[-\frac{(E-E_{th})}{E_{sat}}\right] & (E \geq E_{th}) \end{cases}, \quad (9)$$

where E is the electric field amplitude, $E_{th}$ is the threshold field amplitude, and $E_{sat}$ is the saturation field amplitude. A more compact way of writing the field is in terms of the reduced switching field $E'=(E-E_{th})/E_{sat}$, so that $$\Theta_{E'} = \frac{\pi}{2}\exp(-E'), \quad (10)$$

where $E' \geq 0$. Hence, it is observed that with the choice of Eqs. (7) and (10), $\in_{dxx}(E'<0.693) > \in_{dzz}(E'<0.693)$, while $\in_{dxx}(E'>0.693) < \in_{dzz}(E'>0.693)$. Equivalently, the droplet optic axis switches from being parallel with the x-axis for $E'<0.693$ to being parallel with the z-axis for $E'>0.693$. This behavior for the optical dielectric properties of the nematic droplets is expected for all nematics with positive dielectric anisotropy. FIG. 4 illustrates this behavior in graphical form, showing a graph of $\in_{dxx}/\in_{do}$ and $\in_{dzz}/\in_{do}$ versus E' utilizing Eqs. (7) and (10). In this graph, the ratio of droplet dielectric components is taken to be $\in_{de}/\in_{do}=1.20$.

Continuing, substitution of Eqs. (7) and (10) into Eq. (6) provides a relationship between the reduced electric field strength, the internal Bragg angle, and the optical dielectric properties of the PDLC grating film under the condition of vanishing diffraction efficiency:

$$E' = -\ln\left[\frac{2}{\pi}\sin^{-1}\sqrt{(1+2\gamma)\sin^2\theta'_B - \gamma}\right]. \quad (11)$$

In Eq. (11), the reduced optical anisotropy parameter $\gamma$ is defined as $$\gamma \equiv \frac{\varepsilon_{do} - \varepsilon_P}{\Delta \varepsilon_d}. \quad (12)$$

Note that $-1 \leq \gamma \leq 0$ is obtained for $\in_{do} \leq \in_P \leq \in_{de}$, while $\gamma > 0$ for $\in_P \leq \in_{do}$. In the following discussion, PDLC materials covering $-1 \leq \gamma \leq 0.5$ are considered.

It is this derived equation, Eq. (11) in the present invention, which provides for the fabrication of PDLC transmission phase gratings having extremely high switching contrast. The present invention relies upon the optimization of the internal Bragg angle and the applied electric field strength for a given PDLC materials system to realize the switch state where $\eta = 0$. This is made evident using the following analysis.

Figure 5:
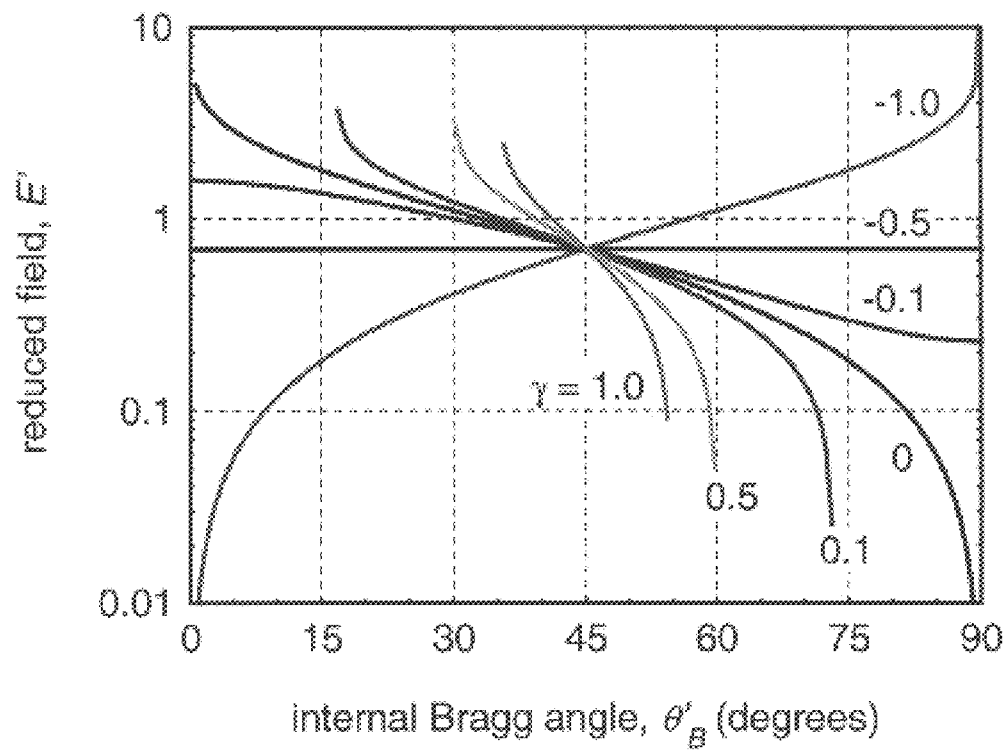
FIG. 5 is a graphic representation of the behavior of the PDLC grating switching field of the grating of this invention versus internal Bragg angle for a family of different PDLC materials that obtains from the condition that the grating diffraction efficiency vanishes.

Equation (11) is plotted in FIG. 5 as a function of internal Bragg angle for PDLC materials systems representing various values of $\gamma$. It is clear from this figure that for a given material system, or choice of $\gamma$, the diffraction efficiency vanishes for selected values of the applied field strength E' and internal Bragg angle $\theta'_B$.

Three illustrative examples of the present invention are now presented, not for purposes of limitation of the invention, but rather for a clearer understanding of the invention. First, for materials with $\gamma > 0$, or equivalently, for $\in_P < \in_{do}$, the range in internal Bragg angle that leads to zero diffraction efficiency is bounded according to the following relationship:

$$\sin^{-1}\sqrt{\frac{\gamma}{1+2\gamma}} \leq \theta'_B \leq \sin^{-1}\sqrt{\frac{1+\gamma}{1+2\gamma}}. \quad (13)$$

These bounds in $\theta'_B$ are evident in FIG. 5. Thus, high contrast gratings made using materials with $\in_P < \in_{do}$ are restricted to a range in internal Bragg angle that is dependent on the PDLC optical dielectric properties. Next, consider materials with $-0.5 < \gamma \leq 0$, or $\in_{do} \leq \in_P < \overline{\in}_d$. These materials may be configured as high contrast gratings without restriction in the range of $\theta'_B$ (consistent with the grating operating in the Bragg regime), and display the property that the electric field strength required to achieve grating transparency is a decreasing function of $\theta'_B$. Finally, consider materials with $\gamma < -0.5$, or $\in_P > \overline{\in}_d$. As in the second example, high contrast gratings have no restriction in the range of $\theta'_B$ (consistent with the grating operating in the Bragg regime); but in this case, the electric field strength required to clear the grating is an increasing function of $\theta'_B$.

Figure 6A:
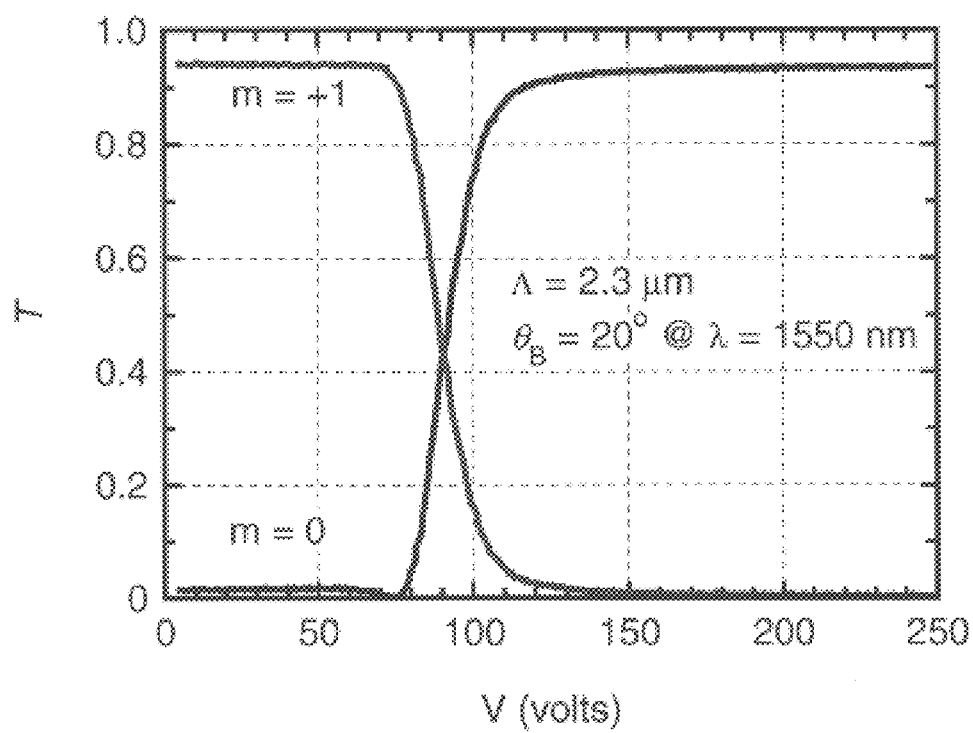
FIGS. 6 A, B and C are graphic representations of a series of three data sets showing grating transmission in the zero- and first-order optical beams as a function of applied voltage.
Figure 6B:
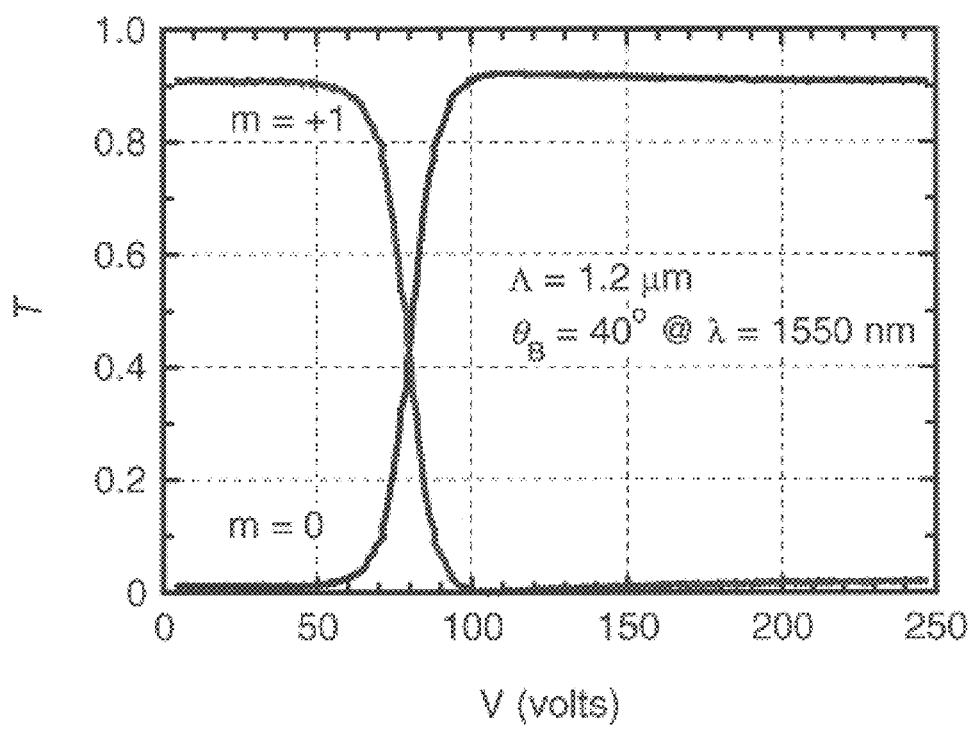
Figure 6C:
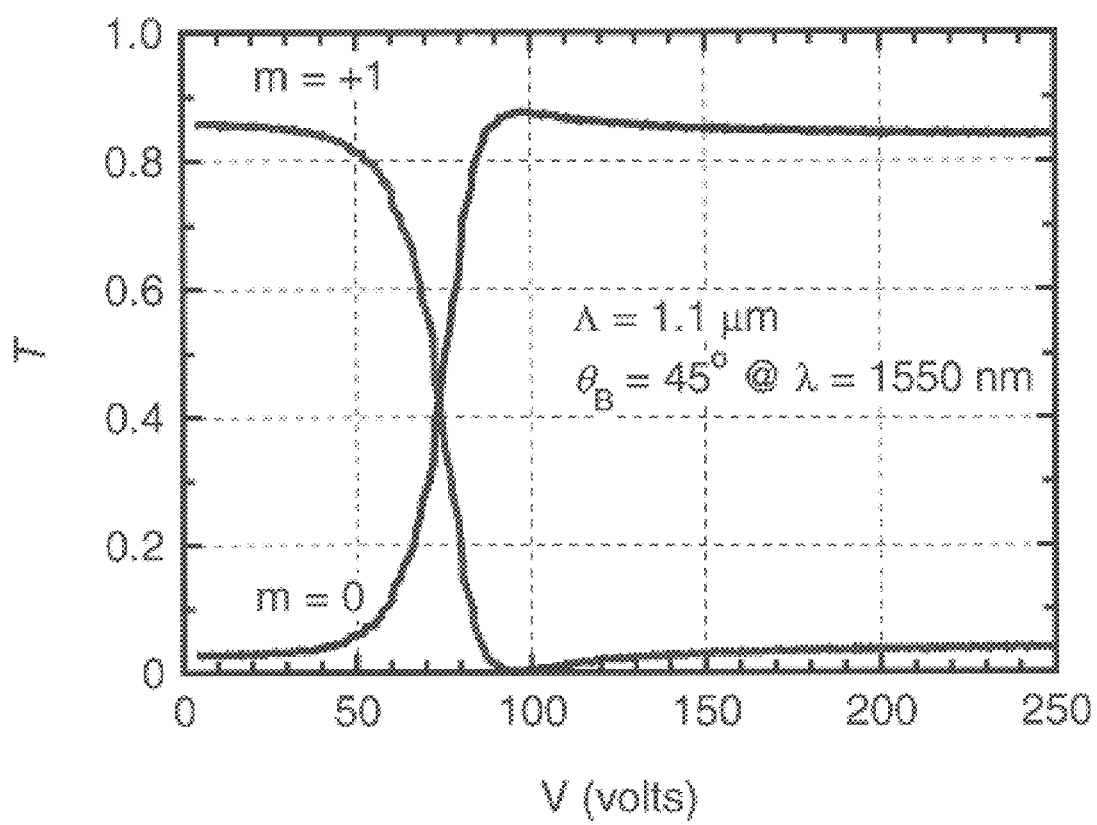

As a demonstration of these concepts, three PDLC gratings were fabricated using a 2:1 mixture by weight of nematic TL203 and PDLC pre-polymer PN393, respectively; both being available from EM Industries of Hawthorne, N.Y. In the resulting gratings it was determined that $\in_P \approx \in_{do}$ and therefore $\gamma \approx 0$. All three gratings were designed for use at a wavelength of $\lambda = 1550$ nm and have grating period values of $\Lambda = 2.3$, 1.2 and 1.1 $\mu$m, corresponding to external Bragg values of $\theta_B = 20$, 40, and 45°, respectively. The grating thickness for all three gratings was L=11 $\mu$m. FIGS. 6(A), 6(B) and 6(C) show the grating transmission of these gratings using p-polarized light, for the m=0 and +1 orders as a function of applied voltage. Note that the gratings with $\theta_B = 40$ and 45° exhibit minima in diffraction efficiency at finite switching voltage values, while the grating with $\theta_B = 20°$ exhibits a minimum only at asymptotically large values of the switching voltage. This trend is also evident in the theoretical data shown in FIG. 5 for the curve labeled $\gamma = 0$. Table 1 displays the trend, listing the voltage at which each of the three gratings reaches a diffraction efficiency value that is -27 dB below the value in the voltage-off state.

TABLE 1

| FIG. | EXTERNAL BRAGG ANGLE | | VOLTAGE AT -27 dB |
|------|------|------|------|
| 6(A) | 69 | 20° | 232 volts |
| 6(B) | 72 | 40° | 102 volts |
| 6(C) | 75 | 45° | 94 volts |

Hence, the present invention provides an analysis which sets forth a basis for the selection, adjustment and design of PDLC constituents, selection of the Bragg angle, and the choice of applied electric field strength in order to optimize PDLC gratings. The present invention further utilizes the above parameters for realizing the grating state whereby the diffraction efficiency vanishes for p-polarized incident light, thus achieving optimized switching contrast.

Although the invention has been described with respect to various embodiments, it should be realized this invention is also capable of a wide variety of further and other embodiments within the spirit and scope of the appended claims.

What is claimed is:

1. A polymer dispersed liquid crystal (PDLC) transmission phase grating capable of operating in the Bragg regime, the grating comprising:

a cell having a pair of oppositely disposed substrates;

a PDLC grating film contained within said cell, said PDLC film having a spatially periodic distribution of grating planes comprising polymer-rich regions and liquid crystal-rich regions, wherein the major constituent of said polymer-rich regions is a polymer, and wherein the liquid crystal constituent concentration within said liquid crystal-rich regions is greater than the liquid crystal constituent concentration within said polymer-rich regions;

said polymer-rich regions characterized by a scalar optical dielectric constant with a value that remains substantially unperturbed by an electric field being applied in a direction perpendicular to said PDLC grating film;

said liquid crystal-rich regions comprising a polymer matrix containing a liquid crystal-rich material, and said liquid crystal-rich material being characterized by optical dielectric tensor components;

said optical dielectric tensor components comprising an ordinary component measured within said grating planes and an extraordinary component measured perpendicular to said grating planes, said components each having a value determined in the absence of said electric field;

said liquid crystal-rich material having values of said optical dielectric tensor components capable of being altered by the application of said electric field; and said spatially periodic distribution having a spatial period of preselected value, and said electric field strength having a strength of preselected value, each said preselected value of said spatial period and said electric field strength being based upon the relationship between said scalar optical dielectric constant and said optical dielectric tensor components;

wherein the PDLC transmission phase grating is rendered substantially transparent when subjected to said electric field during the application of light that is p-polarized and incident on the grating at Bragg angle.

2. The grating as defined in claim 1 wherein said scalar optical dielectric constant has a value that is less than the value of said ordinary optical dielectric tensor component such that the grating has a diffraction efficiency of substantially zero upon said application of said electric field during the application of p-polarized light incident at the Bragg angle when the grating has an internal Bragg angle within a preselected range of angles.

3. The grating as defined in claim 1 wherein said scalar optical dielectric constant has a value that is equal or greater than the value of said ordinary optical dielectric tensor component, and said scalar optical dielectric constant has a value that is less than the average of said ordinary component and said extraordinary dielectric component, such that the grating has a diffraction efficiency of substantially zero upon said application of said electric field during the application of p-polarized light incident at the Bragg angle for a preselected internal Bragg angle.

4. The grating as defined in claim 1 wherein said scalar optical dielectric constant has a value that is greater than the average of said ordinary dielectric component and said extraordinary dielectric component such that the grating has a diffraction efficiency of substantially zero upon said application of said electric field during the application of p-polarized light incident at the Bragg angle for a preselected internal Bragg angle.

5. The grating as defined in claim 2 wherein said liquid crystal material is contained in droplets dispersed in a polymer matrix.

6. The grating as defined in claim 2 wherein said liquid crystal material is contained in an interconnected polymer matrix.

7. The grating as defined in claim 2 wherein said liquid crystal is a eutectic mixture of nematic liquid crystals.

8. The grating as defined in claim 2 wherein said liquid crystal has a positive dielectric anisotropy.

9. The grating as defined in claim 2 wherein said grating planes are unslanted.

10. The grating as defined in claim 3 wherein said liquid crystal material is contained in droplets dispersed in a polymer matrix.

11. The grating as defined in claim 3 wherein said liquid crystal material is contained in an interconnected polymer matrix.

12. The grating as defined in claim 3 wherein said liquid crystal is a eutectic mixture of nematic liquid crystals.

13. The grating as defined in claim 3 wherein said liquid crystal has a positive dielectric anisotropy.

14. The grating as defined in claim 3 wherein said grating planes are unslanted.

15. The grating as defined in claim 4 wherein said liquid crystal material is contained in droplets dispersed in a polymer matrix.

16. The grating as defined in claim 4 wherein said liquid crystal material is contained in an interconnected polymer matrix.

17. The grating as defined in claim 4 wherein said liquid crystal is a eutectic mixture of nematic liquid crystals.

18. The grating as defined in claim 4 wherein said liquid crystal has a positive dielectric anisotropy.

19. The grating as defined in claim 4 wherein said grating planes are unslanted.

* * * * *